United States Patent [19]
Kajiwara

[11] Patent Number: 5,369,584
[45] Date of Patent: Nov. 29, 1994

[54] CONTROL APPARATUS FOR A VEHICLE

[75] Inventor: Yasuya Kajiwara, Himeji, Japan

[73] Assignee: Mitsubishi Denki Kabushiki Kaisha, Tokyo, Japan

[21] Appl. No.: 83,490

[22] Filed: Jun. 30, 1993

Related U.S. Application Data

[63] Continuation of Ser. No. 622,907, Dec. 6, 1990, abandoned.

[30] Foreign Application Priority Data

Dec. 8, 1989 [JP] Japan .................................. 1-317638

[51] Int. Cl.$^5$ .............................................. G06F 15/20
[52] U.S. Cl. ......................... 364/424.05; 364/424.01; 364/424.1; 364/431.11; 364/449; 340/459
[58] Field of Search ........... 364/424.05, 424.1, 424.01, 364/431.11, 449; 340/459

[56] References Cited

U.S. PATENT DOCUMENTS

| | | | |
|---|---|---|---|
| 4,316,251 | 2/1982 | Saito et al. | 364/425.05 |
| 4,454,583 | 6/1984 | Schneiderhan et al. | 364/449 |
| 4,593,358 | 6/1986 | Takeshima et al. | 364/424.05 |
| 4,843,557 | 6/1989 | Ina et al. | 364/431.11 |
| 4,853,850 | 8/1989 | Krass, Jr. et al. | 364/424.1 |
| 5,091,856 | 2/1992 | Hasegawa et al. | 364/424.05 |

FOREIGN PATENT DOCUMENTS 3730468  3/1989  Germany .

OTHER PUBLICATIONS

SAE Technical Paper Series No. 860,390 Feb. 1986.
IEEE Spectrum Jun. 1986, Coming from Detroit, Networks on Wheels.
IEEE 1986, Workshop on Automotive Applications of Electronics.

*Primary Examiner*—Thomas G. Black
*Assistant Examiner*—Collin W. Park
*Attorney, Agent, or Firm*—Sughrue, Mion, Zinn, Macpeak & Seas

[57] ABSTRACT

The output signals of sensors, which sense the operations of the driver of a vehicle, are input to a central control unit which determines, based thereon, the operating conditions of the driver and generates, as a result of such determination, instruction signals to a power controller for controlling an engine, a transmission, etc., and a drive controller for controlling a steering system, a suspension system, a brake system, an air conditioner, etc., in a comprehensive way. The controllers are also directly connected to the sensors so that they can control the corresponding control means independently of the central control unit. The controllers generate instruction signals to the corresponding control means, which are sub-systems of the total system, so that actuators provided on the respective control means are thereby controlled to operate in conjunction with all the control means through the intermediary of the respective controllers, while priority is given to an instruction from the central control unit. The control means are each provided with sensors in addition to an actuator so that if there is a fault in the data transmission line between the central control unit and the respective control means, the individual control means can properly control the corresponding actuators based on the output signals of the corresponding sensors provided thereon so as to ensure continued travel of the vehicle.

10 Claims, 2 Drawing Sheets

CONTROL APPARATUS FOR A VEHICLE

This is a continuation of application No. 07/622,907 filed Dec. 6, 1990, now abandoned.

BACKGROUND OF THE INVENTION

The present invention relates to a control apparatus for a vehicle in which a central control unit is synergically or systematically connected to respective control means through data transmission lines so as to improve the total reliability and performance of the vehicle.

A known typical electronic control apparatus for a vehicle, for example, controls respective control means such as an engine, a transmission, a brake system, a suspension system, etc., independently of each other, and to this end, it generally has separate sensors required to control each of the control means and controls, based on the outputs of corresponding sensors, an actuator for each control means. In contrast, a new idea of commonly utilizing data for varying electronic control devices through data communications therebetween has recently been developed. For example, such an idea is described in SAE Technical Paper Series No. 860390 by Frederick H. Phall and David J. Arnett, entitled "In-Vehicle Networking-Serial Communication Requirements and Directions", or an Article Reprint No. AR-507 by Ronald K. Jurgen of IEEE Spectrum issued in September 1986, entitled "Coming from Detroit: Network on Wheels", or an article by David J. Arnett, entitled "IEEE WORKSHOP ON AUTOMOTIVE APPLICATIONS OF ELECTRONICS".

FIG. 2 shows the general arrangement of an example of a known control apparatus for a vehicle. The known apparatus illustrated includes a switch means comprising various switches operated by the driver of a vehicle, an instrument panel 2 having various meters, indicators and the like for indicating the travelling conditions of the vehicle, an engine control means 3 equipped with various sensors 13, a transmission control means 4 with sensors 14, a suspension control means 5 with sensors 15, a brake control means 6 with sensors 16, a traction control means 7 with sensors 17, an air conditioner control means 8, a navigator 9, a trip computer 10, various lamps 18, a mirror/window drive motor 19, audio/visual equipment 20, a seat motor 21, a wiper motor 22, a diagnosis device 23, a real time bus 24 for transmitting control signals to actuators 28, an information bus 25 for transmitting information, a body control bus 26 for transmitting signals to the switches and the motors so as to control the body of the vehicle, a gateway 27 connecting between the buses 24, 25 and 26, a first processor 11 for converting signals between the buses 24, 25, and a second processor 12 for converting signals between the buses 25, 26.

The above-described known control apparatus as constructed above operates as follows. First, the respective control means 3 through 7 receive signals from the corresponding sensors 13 through 17, perform necessary calculations based thereon, and drive and control the corresponding actuators 28 through the real time bus 24 in accordance with the result of the calculations. On the other hand, the signals from the various sensors 13 through 17 are also fed to the information bus 25. Thus, signals from the switch means 1, which are manipulated by the driver, are fed to the air conditioner control means 8, the navigator 9 and the trip computer 10 which in turn drive and control, based thereon, the corresponding actuators 28, and which at the same time send signals indicative of their operating conditions to the information bus 25. The lamps 18, the mirror/window drive motor 19, the audio/visual equipment 20, the seat motor 21 and the wiper motor 22 are directly driven by the signals from the driver-operated switch means 1. The signals on the information bus 25 are input to the meters and indicators on the instrument panel 2 so as to display information necessary to the driver.

Further, the signals on the information bus 25 are also input to the diagnosis device 23 which diagnoses, based thereon, the functionalities such as faults of the sensors 13 through 17. The real time bus 24 and the information bus 25 are interconnected to each other through the gateway 27 with the first processor 11 interposed therein so as to supply the signals on the real time bus 24 to the diagnosis device 23. Similarly, the body control bus 26 and the information bus 25 are interconnected to each other through the gateway 27 with the second processor 12 interposed therein so as to supply the signals on the body control bus 26 to the diagnosis device 23 and the meters and indicators on the instrument panel 2.

With the above-mentioned known control apparatus for a vehicle, the respective control means 3 through 7 perform the respective control operations independently of each other, so that only the signal lines for driving the actuators 28 and the signals from the driver-operated switches 1 are merely multiplexed or commonly used. Further, the sensors 13 through 17 merely generate signals for the purpose of displaying information on the instrument panel 2. Accordingly, it is neither economical nor logical to install communication ICs on the respective control means 3 through 7 for communication therebetween without providing any additional functions. Moreover, the real time bus 24 for driving the actuators 28 is of very much significance and if there takes place a malfunction or fault in the bus 24, the entire system is forced to cease its intended functions, making any further continued travel of the vehicle impossible.

SUMMARY OF THE INVENTION

In view of the above, the present invention is intended to obviate the above-described problems of the known control apparatus for a vehicle.

An object of the present invention is to provide an improved control apparatus for a vehicle in which conventional individual control means are synergically or systematically connected with each other so as to effectively bring about what the driver intends to achieve.

Another object of the present invention is to provide an improved control apparatus for a vehicle which is able to perform an intensive or comprehensive operation while maintaining total coordination in various individual operations.

A further object of the present invention is to provide an improved control apparatus for a vehicle which is improved in cost performance.

A yet further object of the present invention is to provide an improved control apparatus for a vehicle which is able to prevent the shut-down of the entire system of the apparatus even if there are faults in the data transmission lines.

According to the present invention, there is provided a control apparatus for a vehicle having a power system including an engine, a transmission, etc., and a drive system including a steering system, a suspension system, a brake system, an air conditioner, etc.

The apparatus comprises:
a plurality of sensors for sensing the operations performed by a driver;
a central control unit for determining, based on the output signals of said sensors, the operating condition of the driver;
a first controller connected to said central control unit through a data transmission line for controlling the power system of the vehicle;
a second controller connected to said central control unit through a data transmission line for controlling the drive system of the vehicle;
first control means connected to said first controller for controlling the power system; and
second control means connected to said second controller for controlling the drive system.

Preferably, the power controller and the drive controller are respectively connected to the sensor means through data transmission line means so that they can control the first and second control means based on the output signals from the sensor means independently of the central control unit when there is no output signal from the central control unit while priority is given to the output signals from the central control unit.

In one embodiment, the first control means comprises engine control means and transmission control means, and the second control means comprises steering control means, suspension control means, brake control means and air conditioner control means.

The output signals of the sensors, which sense the operations of the driver, are input to the central control unit which determines, based thereon, the operating conditions of the driver and generates, as a result of such determination, instruction signals to the power controller and the drive controller in a comprehensive way. The respective controllers generate instruction signals to the respective corresponding control means, which are sub-systems of the total system, so that actuators provided on the respective control means are thereby controlled to operate in conjunction with all the control means through the intermediary of the respective controllers, while priority is given to an instruction from the central control unit. The control means are each provided with sensors in addition to an actuator so that if there is a fault in the data transmission line between the central control unit and the respective control means, the individual control means can properly control the corresponding actuators based on the output signals of the corresponding sensors provided thereon so as to ensure continued travel of the vehicle. Moreover, data on the diagnosis and data to be displayed at the instrument panel are all collected to the central control unit.

The above and other objects, features and advantages of the present invention will become apparent from the following detailed description of a preferred embodiment of the invention taken in conjunction with the accompanying drawings.

BRIEF DESCRIPTION OF THE DRAWINGS

In the drawings, the same symbols indicate the same or corresponding components.

DESCRIPTION OF THE PREFERRED EMBODIMENT

The present invention will now be described in detail with reference to a preferred embodiment as illustrated in the accompanying drawings.

Figure 1:
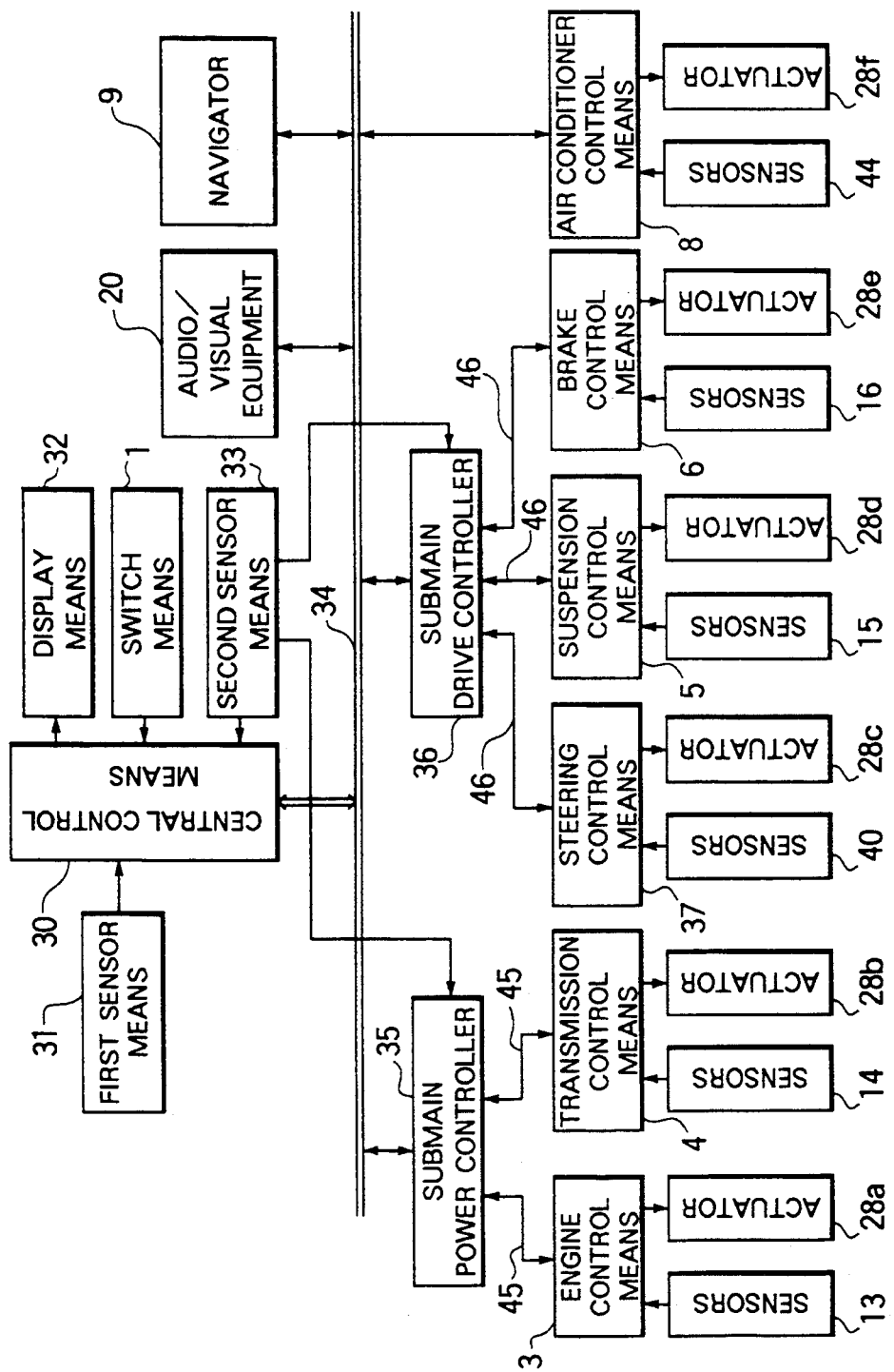
FIG. 1 is a block diagram of a control apparatus for a vehicle in accordance with the present invention.

Referring to FIG. 1, there is illustrated a control apparatus for a vehicle constructed in accordance with the principles of the present invention. The apparatus illustrated includes a central control unit 30, a first sensor means 31 for sensing the environmental situations around a vehicle and including, for example, a road condition sensor for sensing the surface condition of a road on which the vehicle is travelling, a distance sensor for sensing the distance between the vehicle and a preceding or following vehicle, a display means 32 for displaying information such as various diagnosis information on the instrument panel, and a second sensor means 33 for sensing the operations of the driver and including, for example, an acceleration sensor, a brake sensor, a steering sensor, a sleep sensor for sensing that the driver falls asleep, and the like. The output signals of the second sensors 33 are directly input to a first controller 35 in the form of a submain power controller for controlling a power system of the vehicle, as well as a second controller 36 in the form of a submain drive controller for controlling a drive system of the vehicle.

The apparatus further includes a data transmission line 34 which performs data transmission between the first and second controllers 35, 36 and a plurality of subsystems comprising an air conditioner control means 8, a navigator 9 and audio/visual equipment 20, or transmits instructions from the central control unit 30 to these components.

The apparatus further includes a steering controller 37 for controlling a steering system of the vehicle, actuators 28a through 28f provided on the control means 3, 4, 37, 5, 6 and 8, respectively, sensors 40, 44 provided on the steering control means 37 and the air conditioner control means 8, respectively, a data transmission line 45 between the submain power controller 35 and the control means 3, 4, and a data transmission line 46 between the submain drive controller 36 and the control means 37, 5 an 6.

Figure 2:
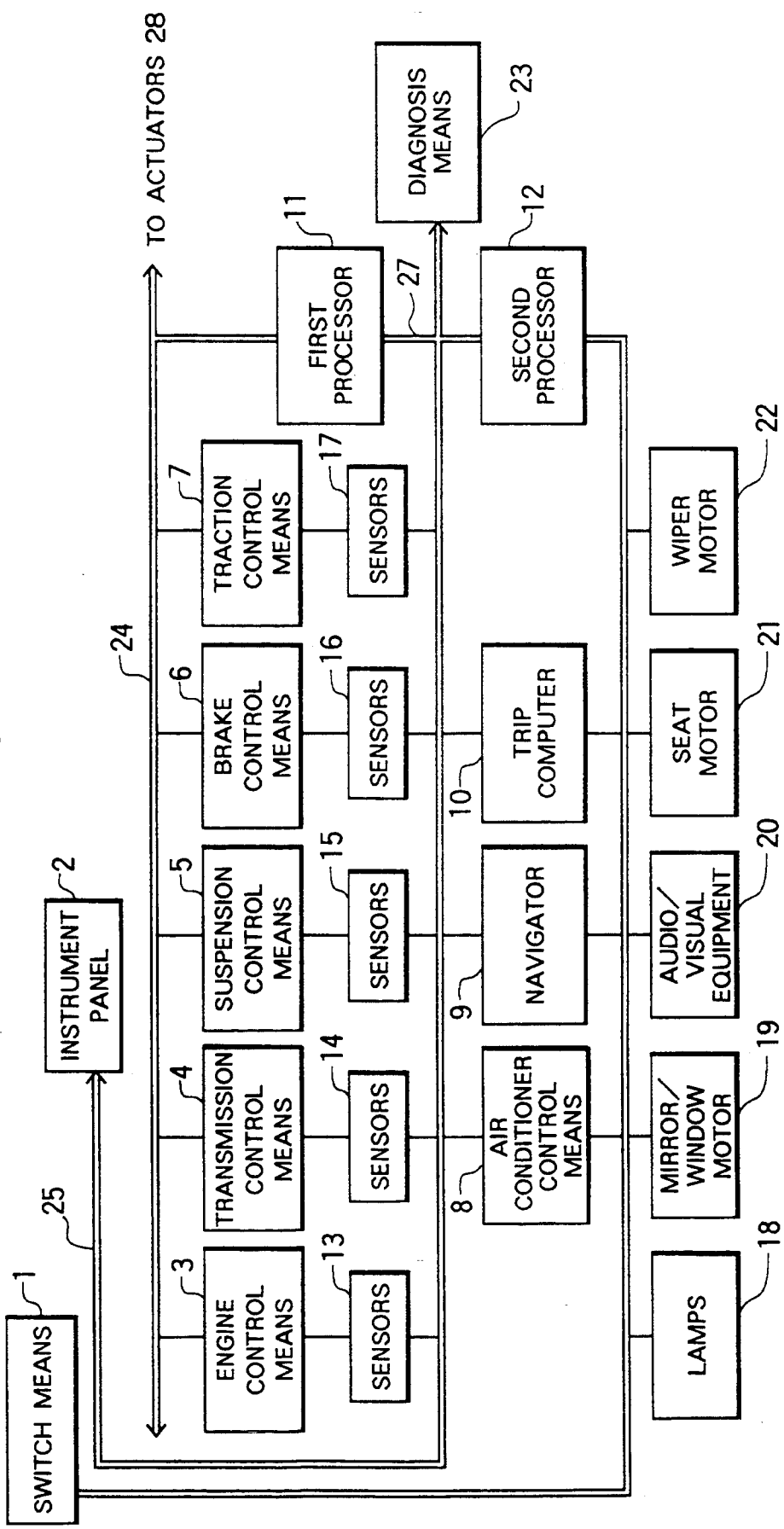
FIG. 2 is a view similar to FIG. 1, but showing a known control apparatus for a vehicle.

In addition to the above-described components, the apparatus includes the same components as those in FIG. 2, which are indicated by the same symbols in FIG. 1.

The above-described embodiment as constructed above operates as follows.

The output signals of the switch means 1 and the second sensor means 33, which sense the operations of the driver, are input to the central control unit 30 as well as to the submain power controller 35 and the submain drive controller 36. The submain power controller 35 controls the engine control means 3 and the transmission control means 4 in combination so as to intensively or comprehensively control the power system. To this end, the power controller 35 is connected to the engine and transmission control means 3, 4 through a fast transmission line 45 so as to perform data transmission therebetween. The engine and transmission control means 3, 4 receive the output signals from the sensors 13, 14, respectively, and drive the actuators 28a, 28b, respectively. Thus, the entire power system is controlled in a unitary or comprehensive manner by the submain power controller 35 and the respective control means 3, 4 with the submain power controller 35 acting as a central or main controller, so that even if no information is provided through the data transmission line 34 to the submain power controller 35, it is still able to properly control the control means 3, 4 through the signals from the second sensor means 33 independently of the central control unit 30. For example, when the transmission control means 4 generates a transmission start signal to the submain power controller 35, the controller 35 sends to the engine control means 3 an appropriate command signal for generating appropriate engine output power.

On the other hand, the submain drive controller 36 is connected to the steering control means 37, the suspension control means 5 and the brake control means 6 through the fast data transmission line 46 for performing data transmission therebetween as well as intensive or comprehensive control of the entire drive system. For example, if a brake is applied, the submain drive controller 36 receives the output signal from an unillustrated brake sensor of the second sensor means 33, and generates an instruction signal to the suspension control means 5 so as to stiffen unillustrated front suspension springs, which act to suspend the front wheels of the vehicle, thus preventing excessive diving thereof. Further, if the vehicle is subject to side or transverse winds during the straight-forward travel thereof, an unillustrated yaw rate sensor of the first sensor means 31 senses such a situation as a yaw rate, so that the submain drive controller 36 generates an appropriate steering control signal to the steering control means 37 so as to control, through the actuator 28c, the unillustrated steering system to properly steer the front wheels of the vehicle in a direction to counteract or offset the yaw rate due to the side winds.

Although in this manner, the individual control means 3, 4, 37, 5, 6 and 8, which are subsystems of the power system or the drive system, have abilities to operate the power system and the drive system independently of each other, they are integrated by the submain controllers 35, 36 so as to provide higher or improved functions. In addition, the central control unit 30 has the function of intensively or totally controlling the submain power and drive controllers 35, 36. For example, during cruise control, the central control unit 30 receives the output signal of an unillustrated distance sensor of the first sensor means 31, and if it is determined that there is a preceding vehicle, it operates to generate and give distance information about the distance to the preceding vehicle as sensed by the distance sensor as well as the speed of the vehicle to the submain power controller 35 in order for the vehicle to properly travel while maintaining an appropriate safety distance therebetween. If there is no preceding vehicle, the central control unit 30 generates an instruction for making the vehicle cruise at a prescribed constant speed. When the vehicle moves backwards, an unillustrated obstacle sensor of the first sensor means 31 is actuated, and if it senses an obstacle on the road rearwardly of the vehicle, the central control unit 30 generates, based on the output signal of the obstacle sensor, an engine control signal to the submain power controller 35 for properly reducing the engine output power, and at the same time a brake signal to the submain drive controller 36 for actuating the brake system even if the driver steps on the accelerator pedal. In other situations, for example, in the case of traction control, the central control unit 30 receives the output signals of an unillustrated vehicle-speed sensor and a wheel-speed sensor of the first sensor means 31 which sense the travelling speed of the vehicle relative to the road surface and the rotational speed of the wheels, respectively, and it determines, based thereon, whether there is a wheel slip, and controls the submain controllers 35, 36 so as to reduce the engine power and at the same time instantaneously apply a brake.

Since all the above information is collected or supplied to the central control unit 30, it is able to display at the display means 32 various kinds of information such as information on the instrument panel, diagnosis information, navigation information, etc. Further, it is possible to control the air conditioner and the audio/-visual equipment 20 through the central control unit 30.

Although in the illustrated embodiment, a total of eight subsystems 3, 4, 5, 6, 8, 9, 20 and 37 are connected to the data transmission line 34, the present invention is not limited to this and the number of such subsystems may be arbitrarily varied as necessary. Further, though the output signals of the second sensors 33 such as the accelerator sensor, the brake sensor, the steering sensor and the like indicative of the operations of the driver are also directly input to the subsystems, they may also be changed at will according to the system requirements.

As described in the foregoing, according to the present invention, data transmission lines are provided for interconnecting between a central control unit and respective submain controllers and at least some of plural control means which are subsystems for performing data transmission therebetween. Further, the output signals of sensors, which sense the operations of the driver and the environmental conditions of the vehicle, are input to the central control unit so that the respective control means integrally controlled by the respective submain controllers are usually permitted to operate independently of the central control unit, but priority is given to the instructions from the central control unit so that the respective control means are preferentially controlled by the instructions of the central control unit. This leads to remarkable improvements in function and cost performance of the total system. Furthermore, in the event that there is a fault in the data transmission lines, the system as a whole does not stop its operation but instead can continue to carry out its intended functions, thus ensuring the continued operation of the vehicle.

What is claimed is:

1. A control apparatus for a vehicle having a power system including at least an engine and a transmission, and a drive system including at least a steering system, a suspension system, a brake system, and an air conditioner, said control apparatus comprising:

a plurality of sensors, including first and second groups of sensors, for sensing various operating conditions of the vehicle;

a central control unit for determining, based on output signals of at least the first group of said sensors, operating conditions of the vehicle and for selectively controlling an overall operation of the vehicle including the power and drive systems;

a first subcontroller, responsive to said central control unit and at least one sensor from the second group of said sensors, for continuously and independently controlling the power system of the vehicle in accordance with at least one of an output of said central control unit and said one sensor from the second group of sensors;

a second subcontroller, responsive to said control unit and at least one sensor from the second group of said sensors, for continuously and independently controlling the drive system of the vehicle in accordance with at least one of an output of said central control unit and said one sensor from the second group of sensors;

first control means, connected to said first subcontroller, for respectively controlling individual components of the power system including the engine and transmission; and second control means, connected to said second subcontroller, for respectively controlling individual components of the drive system including the steering system, suspension system, brake system, and air conditioner, wherein said central controller selectively controls said first and second subcontrollers for actively controlling the power and drive systems, respectively.

2. A control apparatus as claimed in claim 1, further comprising data transmission line means and wherein said first subcontroller and said second subcontroller are respectively connected to said central control unit through said data transmission line means so as to control said first and second control means based on the output signals of said first group of sensors, said first and second subcontrollers giving priority to the output signals from said central control unit to control said first and second control means, and when no output signals are produced by said central unit, said first and second subcontrollers independently controlling said first and second control means, respectively.

3. A control apparatus as claimed in claim 2, wherein said first group of sensors comprises first sensor means for sensing environmental conditions around the vehicle and generating output signals indicative of the sensed environmental conditions to said central control unit, and second sensor means for sensing conditions surrounding the driver of the vehicle and generating output signals indicative of the sensed conditions to the central control unit.

4. A control apparatus as claimed in claim 1, wherein said components of said first control means comprises engine control means and transmission control means.

5. A control apparatus as claimed in claim 4, wherein each of said control means is equipped with sensor means and an actuator.

6. A control apparatus as claimed in claim 1, wherein said components of said second control means comprises steering control means, suspension control means, brake control means and air conditioner control means.

7. A control apparatus as claimed in claim 6, wherein each of said control means is equipped with sensor means and an actuator.

8. A control apparatus as claimed in claim 1, further comprising data transmission line means; and audio/visual equipment connected to said central control unit and said first and second subcontrollers through said data transmission line means.

9. A control apparatus as claimed in claim 1, further comprising data transmission line means; and navigation means connected to said central control unit and said first and second subcontrollers through data transmission line means.

10. A control apparatus as claimed in claim 1, wherein each of said first and second subcontrollers comprising detecting means responsive to said sensors for detecting various operating conditions of the vehicle; and control means for respectively controlling individual components of the power and drive system based on an instructional signal of said central control unit and, if said central control unit does not produce any of said instructional signals, for respectively controlling individual components of the power and drive system based on outputs of said detecting means.

* * * * *